(12) United States Patent
Klemm et al.

(10) Patent No.: US 11,960,070 B2
(45) Date of Patent: Apr. 16, 2024

(54) METHOD FOR CAPTURING A RELATIVE ALIGNMENT OF A SURFACE

(71) Applicant: Carl Zeiss Microscopy GmbH, Jena (DE)

(72) Inventors: Frank Klemm, Jena (DE); Thomas Egloff, Jena (DE)

(73) Assignee: Carl Zeiss Microscopy GmbH, Jena (DE)

(*) Notice: Subject to any disclaimer, the term of this patent is extended or adjusted under 35 U.S.C. 154(b) by 316 days.

(21) Appl. No.: 17/176,694

(22) Filed: Feb. 16, 2021

(65) Prior Publication Data
US 2021/0255447 A1 Aug. 19, 2021

(30) Foreign Application Priority Data
Feb. 18, 2020 (DE) .................... 10 2020 202 022.1

(51) Int. Cl.
*G02B 21/00* (2006.01)
*G02B 21/06* (2006.01)
(Continued)

(52) U.S. Cl.
CPC .............. *G02B 21/06* (2013.01); *G02B 21/34* (2013.01); *G02B 21/361* (2013.01)

(58) Field of Classification Search
CPC ................ G02B 21/00; G02B 21/0004; G02B 21/0016; G02B 21/002; G02B 21/0024; G02B 21/0036; G02B 21/0048; G02B 21/0052; G02B 21/006; G02B 21/008; G02B 21/02; G02B 21/24; G02B 21/241; G02B 21/244; G02B 21/26; G02B 21/36;
(Continued)

(56) References Cited

U.S. PATENT DOCUMENTS 4,978,841 A 12/1990 Barrett et al.
6,594,006 B1 * 7/2003 Muehlhoff ........... G05B 19/402
356/152.1
(Continued)

FOREIGN PATENT DOCUMENTS

DE 10244618 A1 4/2004
WO 0072078 A1 11/2000

OTHER PUBLICATIONS

German Search Report dated Jul. 1, 2020 issued in co-pending DE Application No. 10 2020 202 022.1.

*Primary Examiner* — Thong Q Nguyen
(74) *Attorney, Agent, or Firm* — Duane Morris LLP (57) ABSTRACT

A method for capturing a relative alignment of a surface (2.1), extending substantially in one plane, of an object (2), in which a focus (f) of a light beam is guided along a scanning path (1). Components of the light beam that are reflected by the surface (2.1) are captured. The scanning path (1) extends substantially parallel to an x-y-plane that extends orthogonally to an optical axis (oA) of a detection objective (5). A relative position and alignment of the surface (2.1) are ascertained on the basis of the reflected components. A normal (N) of the surface (2.1) and the relative alignment thereof are virtually ascertained and/or the focus (F) is moved in the direction of the optical axis (oA) during the scanning of the scanning path (1, 1*ax*) such that an axial scan trajectory or an axial scanning path (1*ax*) are brought about.

8 Claims, 9 Drawing Sheets

(51) Int. Cl.
*G02B 21/34* (2006.01)
*G02B 21/36* (2006.01)

(58) Field of Classification Search
CPC .............. G02B 21/361; G02B 21/0012; G02B 21/0028; G02B 21/0032; G02B 21/06; G02B 21/367
USPC .................................................. 359/368–390
See application file for complete search history.

(56) References Cited

U.S. PATENT DOCUMENTS

| | | |
|---|---|---|
| 2015/0054921 A1 | 2/2015 | Dixon et al. |
| 2016/0252713 A1* | 9/2016 | Corwin ................ G02B 21/365 348/80 |
| 2018/0321481 A1 | 11/2018 | Vartiainen et al. |

* cited by examiner

METHOD FOR CAPTURING A RELATIVE ALIGNMENT OF A SURFACE

RELATED APPLICATIONS

The present application claims priority benefit of German Application No. DE 10 2020 202 022.1 filed on Feb. 18, 2020, the contents of which is incorporated by reference in its entirety.

FIELD OF THE INVENTION

The invention relates to a method for capturing a relative alignment of a surface according to the preambles of the independent claims.

BACKGROUND OF THE INVENTION

In the field of microscopy, in particular confocal microscopy, objects to be observed or to be imaged (samples) are aligned relative to a detection objective and, for example, to a focal position. Reflections due to a microscope slide receiving the object or to a transparent element covering the object (both will be referred to as coverslip for the sake of simplicity from now on) can be used for levelling an object. Such reflection identification can be effected for example both with a camera and with a confocal laser scanning microscope.

DE 102 44 618 A1 discloses apparatuses and methods for capturing at least one layer of an object. In that case, a relative position of a reflective layer or interface of the object is ascertained and an observation beam path is focused on the basis of the result.

If the coverslip is inclined with respect to an optical axis of the observation or detection objective, in other words if a normal of the surface of the coverslip and the optical axis of the detection objective are no longer aligned so as to be parallel to each other, significant aberrations may arise. Any inclination of the normal and the optical axis relative to one another is then disadvantageous in particular in the case of detection objectives having high numerical apertures.

The solutions known from the prior art bring about (auto) focusing in which merely a distance measurement takes place but in which a relative alignment of the normal and the optical axis is neither captured nor set in a controlled manner.

SUMMARY OF THE INVENTION

The invention is based on the object of proposing a further possibility for capturing the relative alignment of a surface of an object that is improved over the prior art.

The object is achieved by the subject matter of the independent claim. Advantageous developments are the subject matter of the dependent claims.

The object is achieved with a method for capturing a relative alignment of a surface, extending substantially in one plane, of an object. For this purpose, a focus of a light beam is guided along a scanning path and components of the light beam that are reflected by the surface are captured. The scanning path here extends substantially parallel to an X-Y-plane, which extends orthogonally to an optical axis of a detection objective (lateral scanning path). A substantially parallel extent includes small deviations of a few arcseconds up to 5° from parallelism.

A relative position and alignment of the surface are ascertained on the basis of the captured reflected components. A reference coordinate system that is defined together for the object, the light beam and the optical axis of the detection objective can be used as the reference system.

According to the invention, the captured reflected components of at least one portion of the scanning path are evaluated with respect to a relative position of the surface. A normal of the surface and the relative alignment thereof are ascertained. Alternatively or additionally, the focus can be moved in the direction of the optical axis during the scanning of the scanning path, thus effecting an axial scan trajectory or an axial scanning path.

In a further configuration, the ascertained alignment of the (respective) normal and the alignment of the optical axis of the detection objective are compared with one another with respect to their parallelism. The normal of the surface can be inclined with respect to the optical axis by a tilt angle. The tilt or the tilt angle is based on an alignment of the surface orthogonal to the optical axis. Tilt angles occurring in practice frequently exceed 15', occasionally even values of 60' are exceeded.

As a result, the ascertained alignments of the surface and of a focal plane are thus compared with one another with respect to their parallelism.

The surface is at least partially reflective at least for spectral components of the light beam. In the method according to the invention, in particular reflections that occur at surfaces of a slide or of a coverslip are used. The latter relates in particular to inverse systems in which the object is located on the coverslip and illumination and/or detection is/are effected through the coverslip. The reflective surface can be, for example, an interface of a slide or of a coverslip. The surface does not need to be an external surface of the object but can also pass through it at least in part.

The results of the comparison can be stored with respect to the relevant portion of the scanning path, for example assigned to the global and/or relative spatial coordinates thereof. In addition, the ascertained alignment of the normal and/or the alignment of the optical axis can in each case be stored assigned to a relevant portion of the scanning path and to each other.

It is possible that the tilt angle of the normal is dependent on the respectively viewed location on the surface and no general tilt angle for the entire surface can be specified. In one configuration of the method, the normal is therefore ascertained not globally for the surface but rather for a respective location or portion of the scanning path. This is the case for example if the surface extends substantially orthogonally to the optical axis only over regions of its extent. In such a case, in further configurations of the method, a comparison or adaptation of the normal and the optical axis are performed separately for the respective region.

Figure 1A:
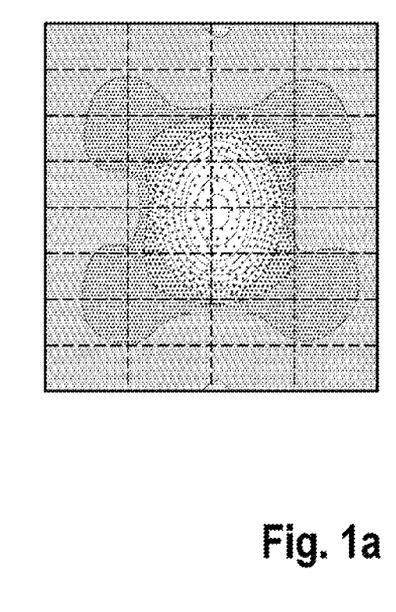
FIG. 1a is an illustration showing that the PSF is imaged symmetrically.
Figure 1B:
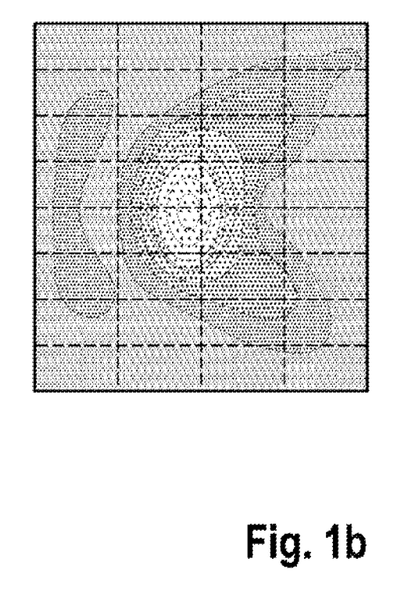
FIG. 1b is an illustration showing clear asymmetry of the PSF.
Figure 1C:
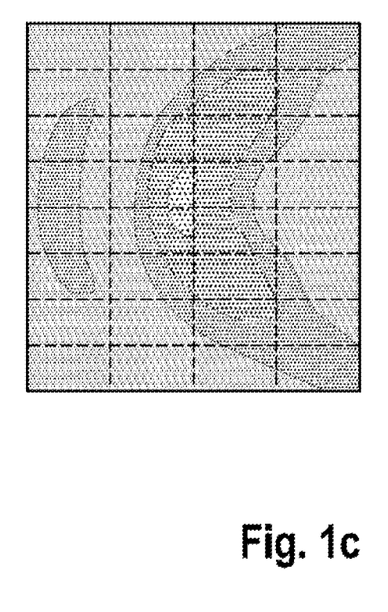
FIG. 1c is an illustration showing even more pronounced asymmetry of the PSF.

A normal can be ascertained on the basis of at least two points on the surface of the object. For example, it is possible to use the coordinates of two reflections to virtually construct between them a straight connecting line and then a normal on said straight connecting line. In a further configuration, a tilt of the surface or the normal relative to the optical axis can be ascertained on the basis of image data. For example, the symmetry of an imaged reflection can be evaluated and the degree of an asymmetry can be used as a measure of a tilt angle that is present. An example of such a procedure is illustrated in FIGS. 1a to 1c. These illustrate the imaging of a point light source in an image plane according to the point spread function (PSF) thereof by way of example for an air objective with a numerical aperture (NA) of 0.95. In FIG. 1a, the PSF is imaged symmetrically, which allows the conclusion to be drawn that an alignment of the surface is orthogonal to the optical axis and a tilt angle is 0' or 0°. The PSF shown in FIG. 1b exhibits a clear asymmetry. Based on reference measurements of a number of point spread functions at different tilt angles, a tilt angle of 10' can be deduced. The asymmetry in FIG. 1c is even more pronounced. A tilt angle of 20' is present. The reduction of the captured intensity with respect to a tilt angle of 0' is 75%, meaning that only a quarter of the original intensity of the light beam is now captured.

Each result obtained by way of the comparison can be used to generate control commands for actuating a sample stage 3 that holds the object 2 or the coverslip 2 (FIG. 10) and is displaceable in a controlled manner. To this end, for example an evaluation unit 4 in the form of a computer can be present, by means of which the data relating to the position and alignment of the optical axis oA of a detection objective 5 of a microscope 8 and of the normal N are compared. The control commands can be generated by means of a correspondingly configured control unit 6, for example a correspondingly configured computer. The evaluation unit 4 and the control unit 6 can be combined with one another.

Figure 10:
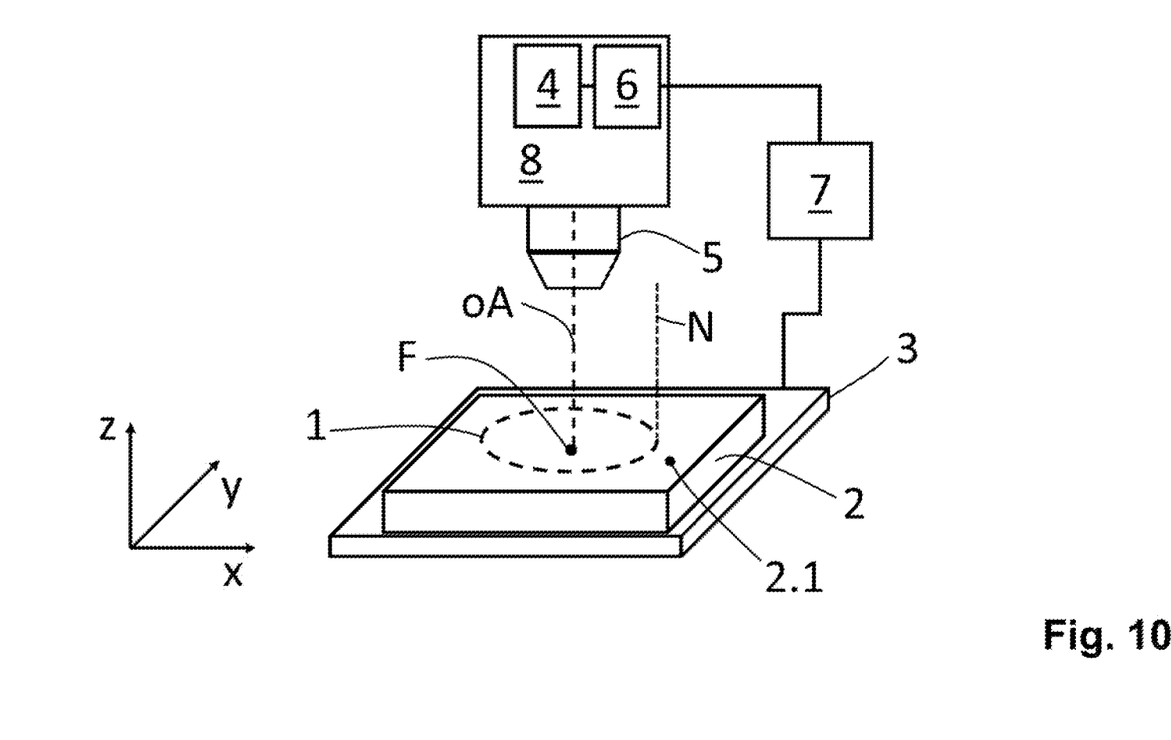
FIG. 10, is a perspective view illustrating an example of a microscope having a sample stage that holds an object or coverslip employing the inventive method.

Advantageously, the sample stage 3, in particular its actuating means 7, is actuated by way of the control commands such that the normal N and the optical axis oA are aligned parallel to one another in a currently observed location or portion of the surface 2.1 of the coverslip 2. The scanning path 1 lies substantially parallel to an xy-plane.

In one advantageous configuration of the method, a focus of the detection objective is moved, during the scanning of the scanning path, in the direction of the optical axis and thus for example in the direction of a z-axis of a Cartesian coordinate system. As a consequence of this focus displacement, the scanning path extends at a tilt with respect to the x-y-plane and intersects it for example in one point (not shown). This resulting profile of the scanning path that is oblique or inclined relative to the x-y-plane makes possible a search for a location of a reflection that is occurring or for a location of a maximum of the reflection along the scanning path 1 in the case of a change in the position in the direction of the z-axis (z-direction). Alternatively, the object 2 can be displaced with respect to the focus F.

The focus can be guided along the scanning path with a laser scanning microscope (LSM) or the scanners thereof. It is possible here to guide the focus and at the same time to ascertain and store the current coordinates thereof. The image of the object can subsequently be detected by means of the detection objective, after the position and alignment of the surface have been ascertained.

In an advantageous development of the method, the light beam is guided such that the scanning path describes a curve that is closed in the x-y-plane. In other words, the profile of the scanning path touches or intersects with itself once at least in the top view. The closed curve can here for example be a circle, an oval, a rectangle, a triangle or a freely selected shape.

If the configuration of the focus displacement in the direction of the z-axis is combined with the configuration of the scanning path as a closed curve, the result is a shape of the scanning path that is like a helix or a spiral in the z-direction. To achieve a shape of the scanning path that is regular in the direction of the z-axis, the scanning path in an x-z-plane and/or in a y-z-plane can likewise describe a regular closed curve, for example a circle, an oval or a rectangle. Overlaying the scanning movements of said curves produces a helical or spiral shape of the scanning path. The focus is advantageously guided with at least one scanner for generating the scanning path in the x-y-plane and one scanner for generating the scanning path in the direction of the z-axis.

In further configurations of the method, the closed curve in the x-y-plane and/or in the y-z-plane can be irregular and have, for example, the shape of a trapezium or another shape. In such a case, an irregular helical or spiral shape of the scanning path is obtained, in which for example the pitches of the spiral shape differ and/or the respective deflections in the direction of the x-axis and/or the y-axis vary. Such a method configuration makes it possible to react flexibly to special shapes of the surface.

With one of the aforementioned configurations of the method it is advantageously possible to ascertain and set an alignment of the surface of the object in absolute terms with respect to a coordinate system and/or relative to the optical axis of the detection objective.

In modifications of the invention, the focus can, as was already described above, be moved in the direction of the optical axis during the scanning of the scanning path, or a resulting relative movement between the focus and the coverslip in the z-direction can be produced. A comparison of the alignment of the optical axis with a normal of the surface is optional.

The axial scanning path can consist of a helical scan trajectory composed of a fast movement in the x-y-plane (e.g. scanning frequency selected from a range of 50 to 600 Hz) and a slow movement in the z-direction (e.g. selected from a range of 0.5 to 10 Hz) (also referred to as axial scan trajectory). A relative position and alignment of the surface are ascertained on the basis of the captured reflected components of the light beam.

In order to optimize the measurement sensitivity with respect to the tilt of the surface, the scanning path can be a circular scan or an approximately rectangular scan trajectory and cover as large an area as possible, taking into account the requirement of efficient method performance. The rectangular scan trajectory can here be composed by a spectral synthesis of harmonics of the fundamental circular scanning frequency.

The axial scan trajectory can be regionally and/or intermittently approximately linear, or the movement along the axial scan trajectory can be intermittently approximately linear. This can be achieved by virtue of the fact that the axial scanning path is composed by a spectral synthesis of harmonics of the fundamental z-scanning frequency.

Using the method according to the invention in each of the aforementioned configurations, the relative position and alignment of the surface can be ascertained. Identified reflections of the focus are used for this purpose. Knowing the current position of the focus both in the axial direction, that is to say the direction of the z-axis, and in the direction of the x-axis and the y-axis allows a precise definition of the relative position and orientation of the surface. Proceeding from this information, the tilt angle of the surface can be ascertained either for the entire surface (=globally) or for a currently viewed location or portion of the surface (=locally).

The ascertained data and generated control commands can be used for assisted manual adjustment and alternatively for automatic adjustment. Alternatively, manual rough adjustment can be performed. A fine adjustment can then be performed automatically on the basis of the control commands.

Knowing the profile of the surface at different locations additionally allows focus tracking of the detection objective in dependence on a currently observed location.

A maximally admissible tilt, that is to say compliance with a maximally admissible tilt angle, can be monitored taking into consideration the data of the objective, any immersion medium that may be used and/or the geometry of the carrier. Exceedance of the admissible tilt angle can be communicated with an acoustic and/or visual signal.

If continuous tracking of the alignment of the normal at different locations is not possible due to the unevenness of the surface, the knowledge of the alignment of the normal in a particular location can be used for computational corrections of image data.

In addition, control commands for correcting any deviations can be generated or displayed. For example, it is possible to display specifically for a user of a microscope on a display which actuating mechanisms must be operated in what actuating direction and by what actuating absolute value in order to compensate any ascertained deviation of the optical axis and the normal to an extent such that said deviation comes to lie within an admissible tolerance limit. In this way, assisted correction of the alignment of the sample carrier can be effected and the success thereof can be checked continuously or at temporal intervals. A successfully performed adjustment can be confirmed to a user with a signal. Such guidance of the user is advantageous in particular because a correction for example only based on a reflection image requires detailed knowledge for example relating to the scanning directions, the spatial arrangement of the actuating mechanisms and the thread pitch and thread direction and can be performed only by experienced users. Assisted correction therefore significantly improves the user-friendliness and operability.

The knowledge relating to the alignment of the normal and the optical axis and the knowledge relating to the degree of the adaptation of both can additionally be taken into account to calculate for example coma or other aberrations. These errors can optionally be reduced or even compensated for by means of Alvarez plates or adaptive optical elements in the beam path in particular of the detection objective.

BRIEF DESCRIPTION OF THE DRAWINGS

In the drawings:

FIG. 9 is a graph illustrating captured scanning values arranged in groups; and

DETAILED DESCRIPTION OF EMBODIMENTS OF THE INVENTION

Further configurations of the inventive method will be explained below with reference to FIG. 1 and FIG. 10 and further figures.

Figure 2:
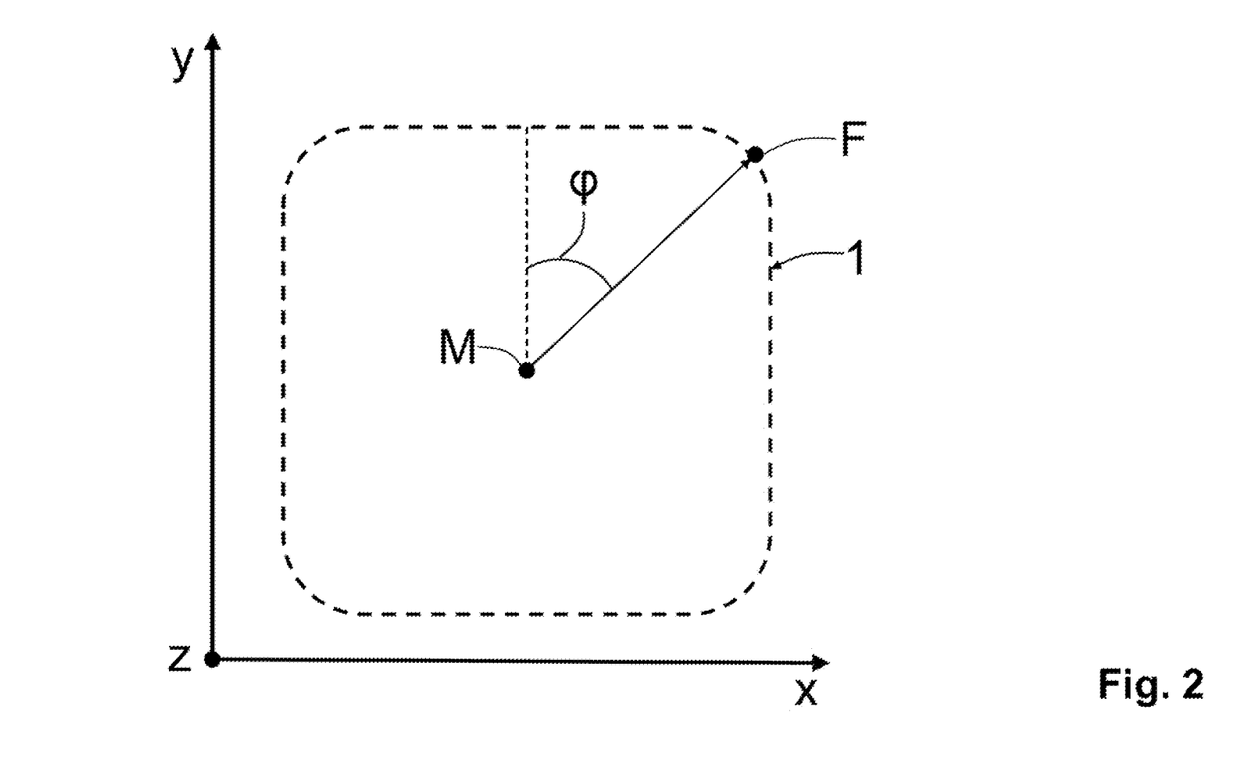
FIG. 2 is a graph illustrating a trajectory scanned by a focus of a light beam in one configuration of the method in the x-y-plane as an of example.

A (scan) trajectory scanned by a focus F of a light beam or a scanning path 1 in one configuration of the method denotes in the x-y-plane a closed curve that is shown merely by way of example (FIG. 2). The latter is composed of a movement in the direction of the x-axis and, orthogonal thereto, a movement in the direction of the y-axis. The area enclosed by the scanning path 1 advantageously covers as large a part of the surface of the coverslip as possible (neither is illustrated). A scanning angle (p is indicated by way of example around the centre M of the scanning path 1 between a straight reference line pointing in the direction of the y-axis (interrupted full line) and an arrow pointing at a current position of the focus on the scanning path 1 (lateral scanning angle).

The lateral scanning path 1 can be described for example as follows:

$x(t)=A_{xy} \cos 2\pi at$ $y(t)=A_{xy} \sin 2\pi at$ or by $x(t)=A_{xy}(9 \cos 2\pi at - \cos 6\pi at)/8$, $y(t)=A_{xy}(9 \sin 2\pi at + \sin 6\pi at)/8$, with: a=fundamental xy-trajectory frequency or scanning frequency.

$A_{xy}$=amplitude term, lateral in the object space

A computational distortion correction and/or taking account of a non-ideal behaviour of a scanner (not shown) used for diverting the light beam can already be effected during the controlling for the deflection of the light beam or only during the evaluation of the data captured. To this end, for example a known group delay or a known system behaviour of the optical and/or mechanical system (system response) can be taken into account.

Scanning in the xy-plane is advantageously effected with moderate frequencies from a range of, for example, 50 to 600 Hz. In addition, a distortion can be corrected if the system response is known, that is to say if characteristics of the mechanical components and/or optical components involved in the production of the scanning movement are known and are taken into account in the evaluation of the captured image data.

A scanning movement in the direction of the z-axis is performed at even lower frequencies. These lie, for example, in a range of 0.5 to 10 Hz. Side effects leading to measurement errors, such as limited axial dynamics and parasitic nick modes, are advantageously reduced in this case.

Figure 3:
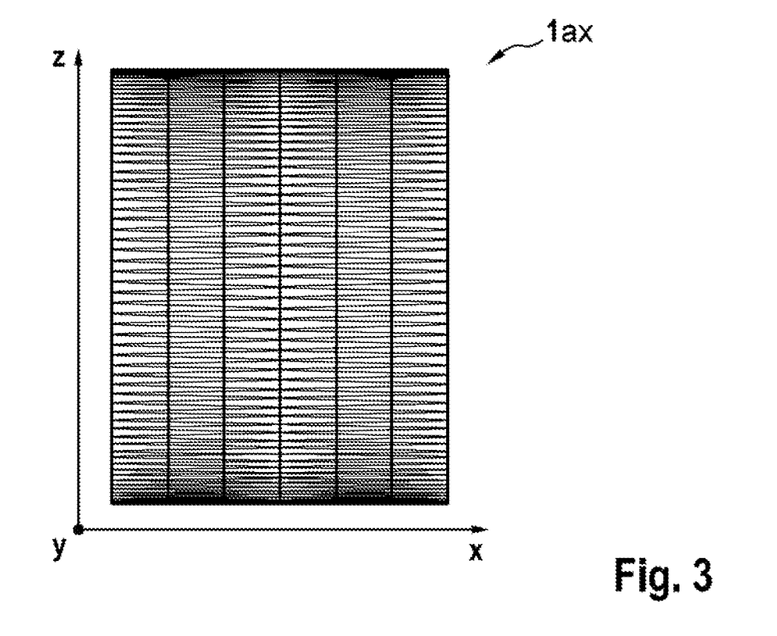
FIG. 3 is a graph illustrating in a side view overlaying movements of the focus along a scanning path in the xy-plane and in the direction of the z-axis leads, by way of example, to a spiral-shaped scanning path.

The movement in the direction of the z-axis (z-movement) is preferably a movement that is synchronous with the xy-scanning and can be unidirectional or bidirectional. Overlaying movements of the focus F along the scanning path 1 in the xy-plane and in the direction of the z-axis z in the case of spatially and temporally matched movement processes for example leads to a spiral-shaped resulting axial scanning path lax illustrated by way of example in FIG. 3 in a side view.

Figure 8:
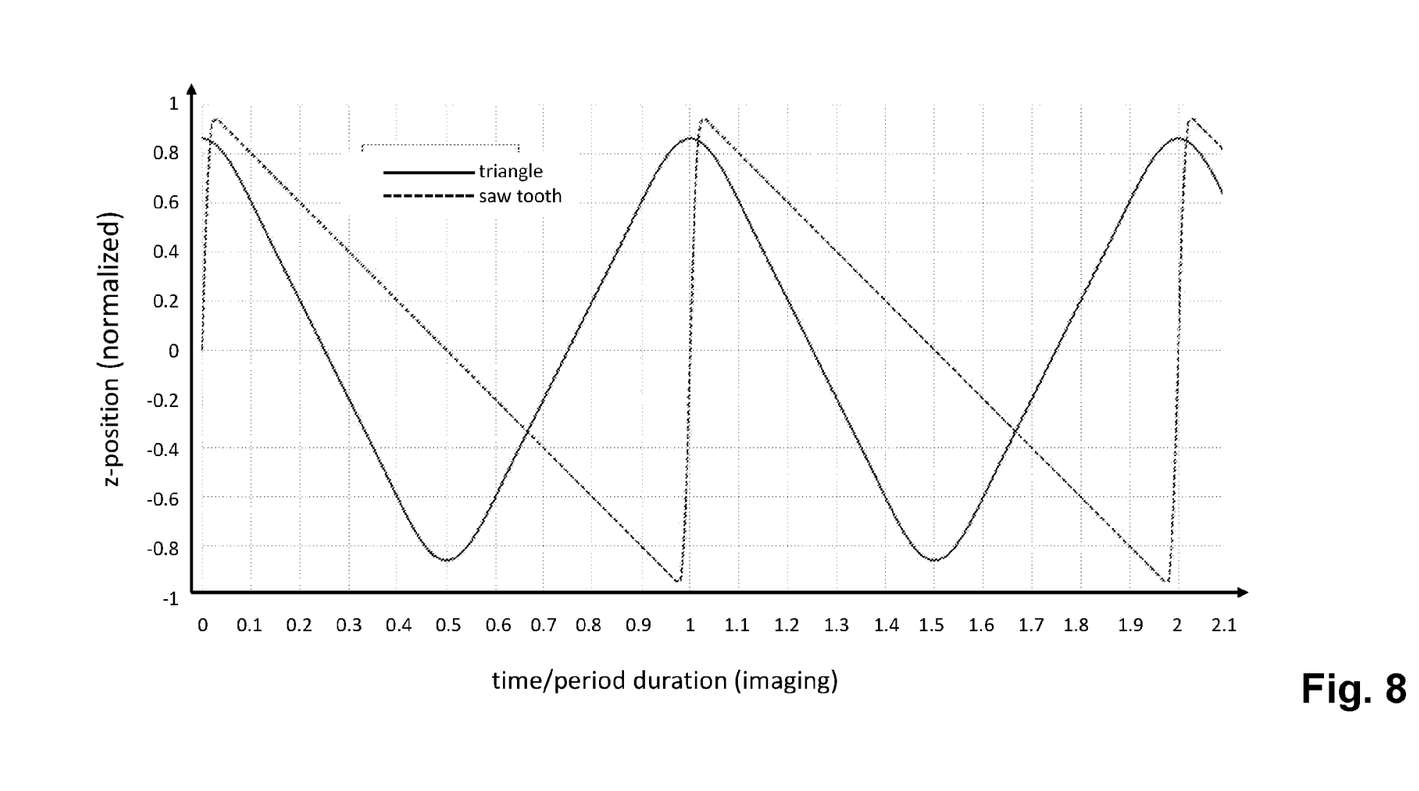
FIG. 8 is a graph illustrating the z-movement can be approximately sawtooth-shaped or triangular.

The z-movement can be approximately sawtooth-shaped or triangular (see FIG. 8) and is preferably effected while avoiding higher-frequency signal components. Examples of such z-movements are:

$$z(t)=A_z(0.784 \cos 2\pi bt + 0.065 \cos 6\pi bt + 0.011 \cos 10\pi bt)$$

or:

$$z(t)=A_z(0.762 \cos 2\pi bt + 0.047 \cos 6\pi bt)$$

with: b=fundamental z-trajectory frequency $A_z$=amplitude term, axial or in the z-direction with triangular Z-actuation and use of a directly controllable actuator or $$z(t)=A_z(1-2(bt-[bt]))$$

with: [ . . . ]—rounding operator
for an actuator that is movable at a constant speed (here in the example with a triangle function, FIG. 8).

The current position of the focus F is known owing to a current alignment and focusing of the light beam. On the basis of this knowledge, a current origin or a captured reflection can be ascertained therefrom.

Figure 5:
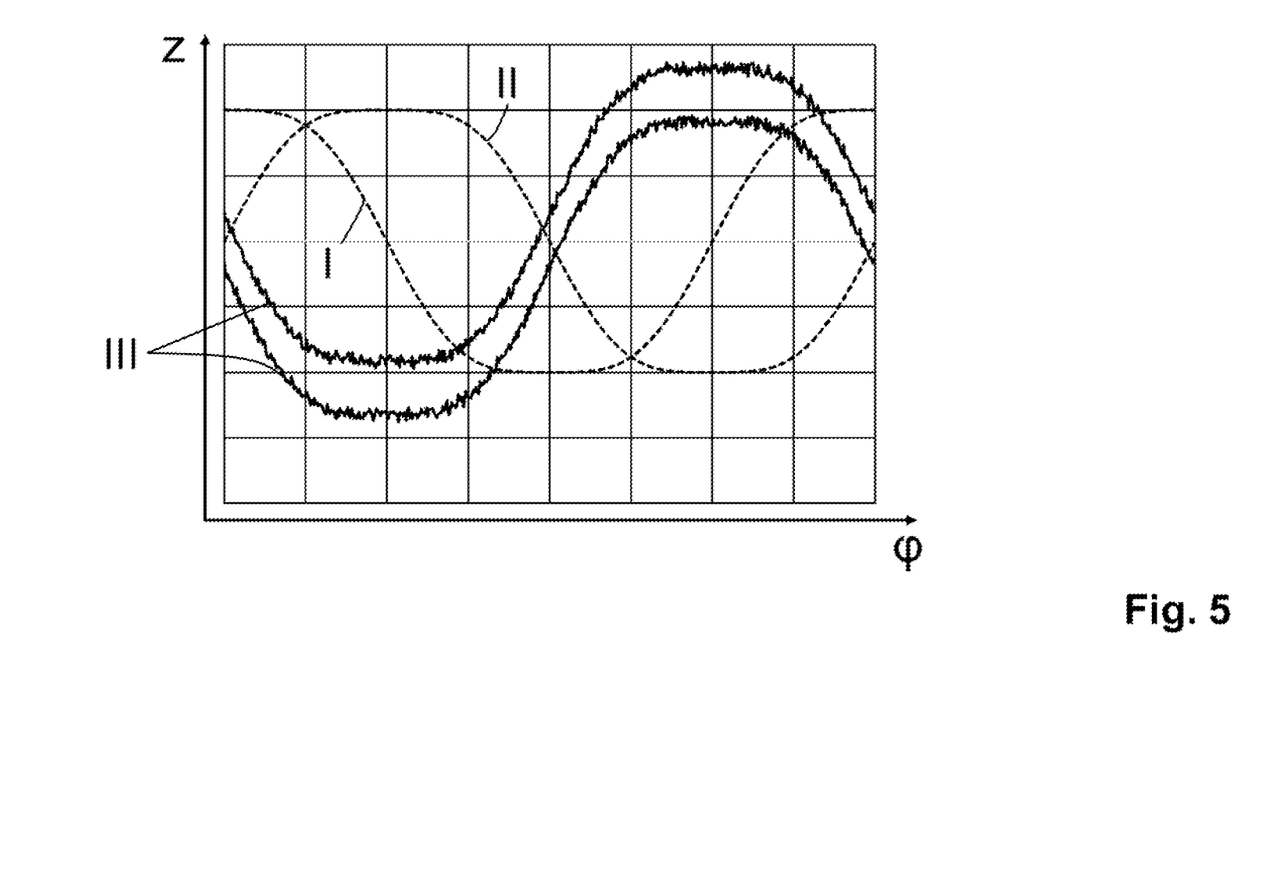
FIG. 5 is a graph illustrating, in the case of a bidirectional z-scan, where curve I indicates the x-component of the movement over $\phi$; II indicates the y-component of the movement over $\phi$ and III indicates the z-position of the maxima.

Captured scanning values can be evaluated for example as described below. The captured scanning values are arranged in groups. For this purpose, the scanning values of a lateral scan can be separated into xy-planes and split into individual z-planes and also segmented into separate z-stacks $k \to I(\varphi, \zeta, k)$ (k=[1, 2]) (see, for example, FIG. 9). In the case of a bidirectional z-scan (FIG. 5), every other z-stack is inverted with respect to the z-position $I_{out}(\varphi, \zeta, [k=2, 4, \ldots ])=I_{in}(\varphi, \zeta_{end}; 1, [k=2, 4, \ldots ])$. The curve I indicates the x-component of the movement over $\phi$; II indicates the y-component of the movement over $\phi$ and III indicates the z-position of the maxima (FIG. 5).

Figure 6A:
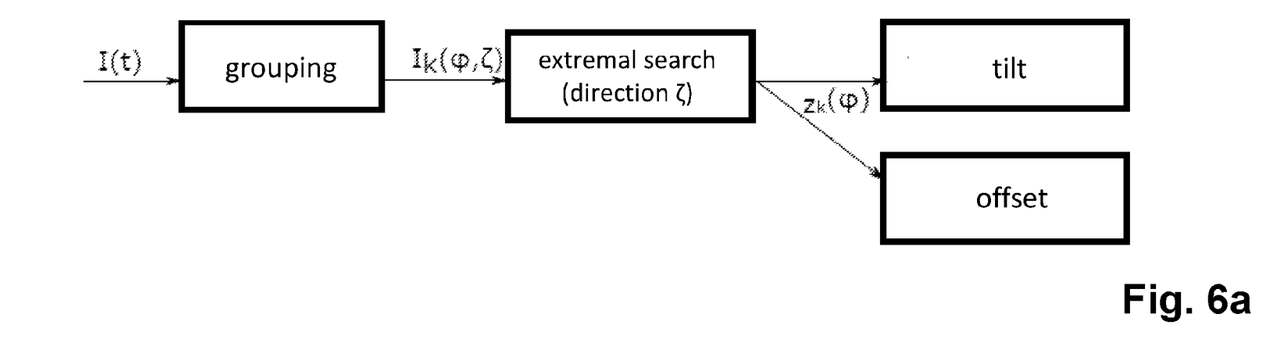
FIG. 6(a) is a flow chart illustrating evaluation based on an extremal search.
Figure 6B:
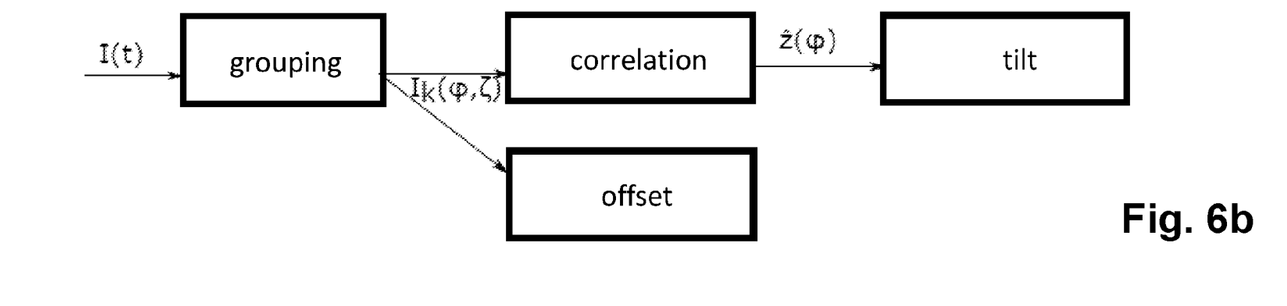
FIG. 6(b) is a flow chart illustrating evaluation based on a correlation of the intensity values.

The further evaluation can be effected by means of the evaluation unit based on an extremal search (variant 1, FIG. 6a) or based on a correlation of the intensity values (variant 2; FIG. 6b).

Figure 4:
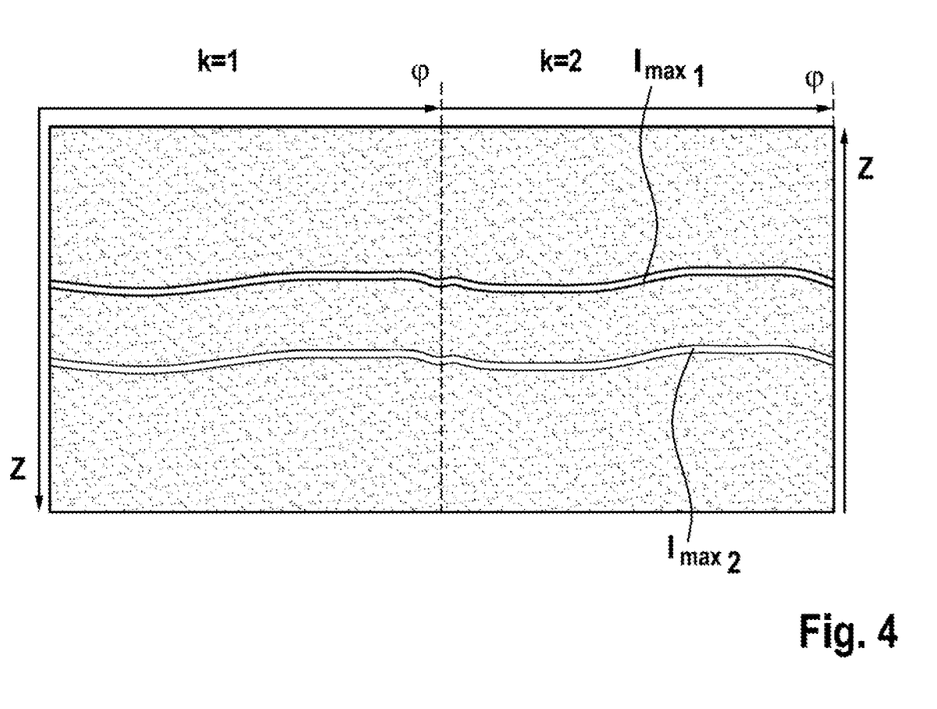
FIG. 4 is a shows intensity profiles $I_{max1}$, $I_{max2}$ of the reflections of the interfaces at different positions in the z-direction over the respective lateral scanning angle.

The evaluation based on the extremal search as variant 1 (FIG. 6a) comprises at least one of the following steps a) to d). A step a) relates to a search for a maximum value along the z-direction in dependence on the scanning angle $\varphi$. An example is illustrated in FIG. 4. It shows intensity profiles $I_{max1}$, $I_{max2}$ of the reflections of the interfaces (surfaces 2.1) at different positions in the z-direction (z-positions) over the respective lateral scanning angle $\varphi$. The intensity profiles $I_{max1}$, $I_{max2}$ are differentiated by upwards movements and downwards movements and accordingly shown in a left and the right region, as is illustrated by way of example using a separation line (interrupted full line). The intensity profile $I_{max1}$ of the first reflection here has a significantly higher intensity than the intensity profile $I_{max2}$ of the second reflection. More generally, the designation intensity profile $I(\varphi_n, \zeta, k_n)$ or $I(\varphi, \zeta)$ can be chosen.

The position of the maximum value can be ascertained by the following methods with greater accuracy than that based on the gradient of the z-scanning. To this end, use can be made of, for example, the following methods.

i) regression, fit or interpolation with a function and ascertaining the maximum of said function or ii) ascertaining the centroid around a maximum. This gives the z-position over the lateral scanning angle $\varphi$ for the different z-stacks ($k_i$ with i=1, 2, . . . , n).

In a step b) the tilt in two orthogonal directions (e.g. x, y) is ascertained by correlation with the nominal lateral deflection in the x- and y-directions (x, y ($\varphi$)). The relevant tilt angle in the two directions can be ascertained from the resulting correlation coefficients.

In a step c), the offset or the position of the coverslip reflection is calculated from the mean of the z-positions of a coverslip reflection.

In a step d) the offset between two z-stacks in the case of the bidirectional z-scan can be calculated as the difference between z-offsets of two successive z-stacks (e.g. between k=1, 2). In this way, it is possible to compensate among other things the position difference between the z-stacks in the outbound and the return direction.

The evaluation by means of correlation of the intensity values (variant 2) is illustrated as a schematic flowchart in FIG. 6b. Ascertaining the tilt includes a correlation of the z-intensity profiles $I(\varphi_i, \zeta, k_1)$ over the lateral scanning angle (p. Next, the location of the maximum correlation (=greatest correlation coefficient in terms of absolute value) for all scanning angles $\varphi$ is calculated. The position of the maximum can be ascertained with greater accuracy than that based on the gradient of the z-scanning by using at least one of these methods: i) regression, fit or interpolation with a function and ascertaining the maximum of said function or ii) ascertaining the centroid around the maximum. This gives the z-position over the lateral scanning angle $\varphi$ for the different z-stacks ($k_i$).

In a subsequent step, the tilt in two orthogonal directions (e.g. x, y) is calculated by way of correlation with the nominal lateral deflection in the x- and y-directions (x, y ($\varphi$)). The angle in the two directions can be ascertained from the resulting correlation coefficients.

The centroid can be evaluated for example by means of the extremal search (variant 1). An example of a result of an extremal search is visualized in FIG. 5. The specific positions of the two reflections are illustrated as full lines here. The target functions (basic functions) of the lateral position (x, y) with which they are correlated are illustrated in dashes as function I for the x-positions and as function II for the y-positions. From their correlation with the result of the extremal search, the angle in the x-direction and in the y-direction, respectively, is obtained.

A correction or levelling of ascertained inadmissible tilts is effected by controlled tilting about the y-axis and/or the x-axis. The mechanical tilt axes do not need to correspond to the scanning coordinate system. The correction or the levelling can therefore represent a resulting movement.

In addition, the position of the scanning path 1, lax relative to the captured reflections, i.e. relative to the surface 2.1, can be ascertained (offset). This information can subsequently be used for focus tracking in particular in the direction of the z-axis.

Dynamic tracking of the z-observation region is advantageous in particular if actuators for setting the normal N, for example actuating means 7 of a sample stage 3 or a sample holder, by means of which as a result the microscope slide or the coverslip 2 can be aligned, are arranged far away from the scanning path 1, 1ax. In this case, when correcting the alignment of the normal N, not only a desirable tilt but also an axial displacement occurs. This axial displacement can be compensated for by focus tracking.

It is optionally also possible that in the case of a triangle movement in the z-direction (bidirectional z-scan, see FIG. 7), the group delay of the z-scanner is ascertained. Knowledge of the group delay advantageously allows the compensation thereof. In this way, an offset in the z-position occurring due to the inertia of the z-scanner or z-actuator can be compensated.

Figure 7:
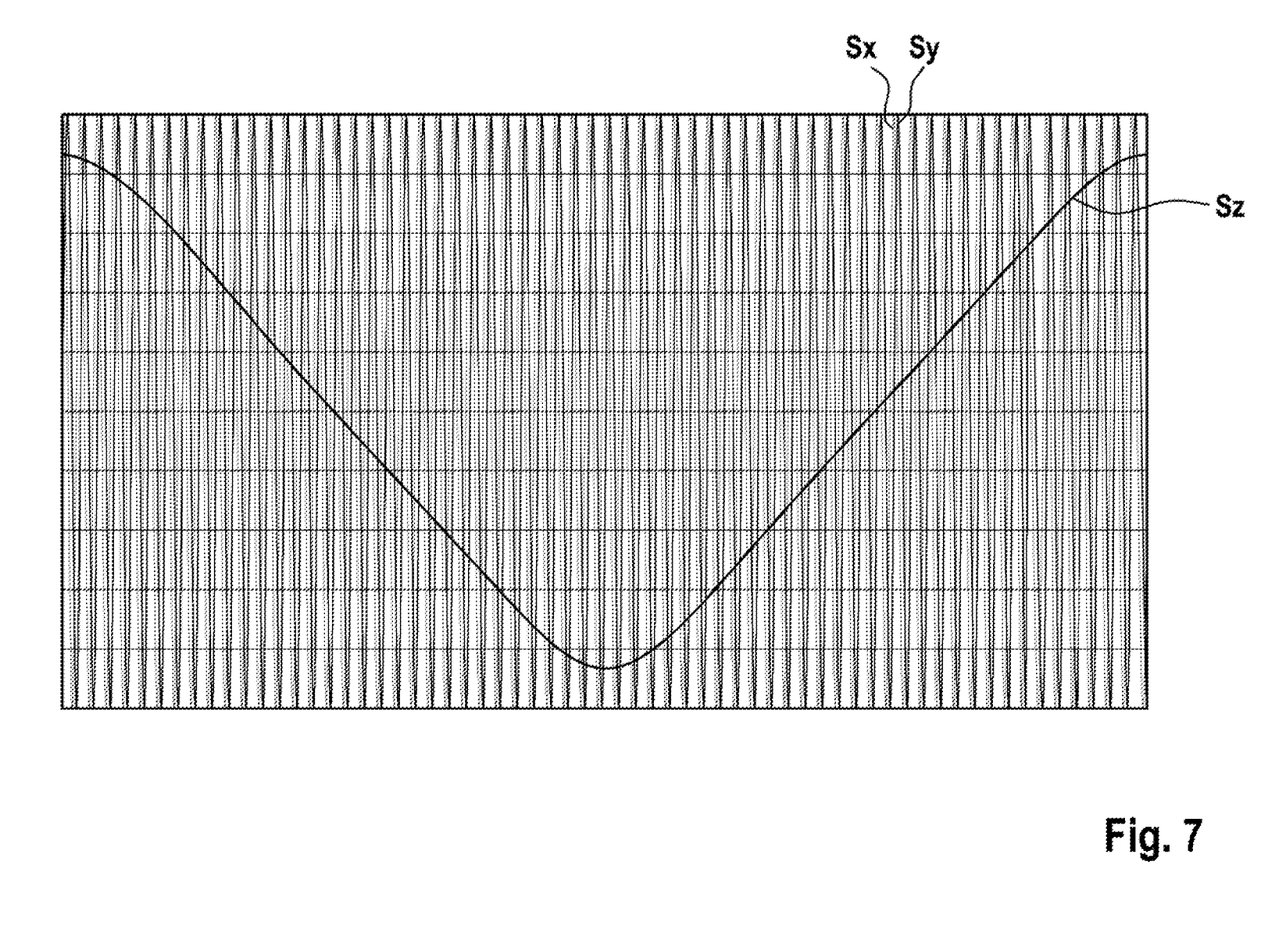
FIG. 7 is a graph illustrating, by way of example, a triangle movement in the z-direction over a period with the overlaid scan in the x-y-plane (denoted with Sx and Sy)

A triangle movement in the z-direction (Sz) over a period is illustrated by way of example in FIG. 7 together with the overlaid scan in the x-y-plane (denoted with Sx and Sy).

If the exact positions of the actuating means 7 and the parameters thereof, such as actuating path length, shortest possible actuating path, actuation accuracy and, in the case of threads, pitch, thread direction and/or thread play are known, control commands can be generated. The control commands can be intended for automatic actuation by means of the actuating means 7 and for this purpose be generated for example in a suitable machine language. The control commands can additionally or alternatively also be generated in the form of instructions for a user and be made available to the user. It is thus possible to indicate to the user which of the existing actuating elements should be operated and the current settings that should be changed for example with respect to the actuating direction and the actuation path lengths.

It is also possible to display to the user the settings that should be effected for example visually in the form of numerical values, colour scales, colour codes and/or (animated) graphics, for example in the form of bars. Furthermore, acoustic information can be used to signal the deviations to the user. For example, it is possible to modulate the tone pitch, volume and/or acoustic codes for different actuating directions according to the information to be transported.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

REFERENCE SIGNS

1 Scanning path
1ax Axial scanning path (in the z-direction)
2 Object, coverslip
2.1 Surface (of object 2/of coverslip 2)
3 Sample stage
4 Evaluation unit
5 Detection objective
6 Control unit
7 Actuating means, actuating motor
8 Microscope
$I_{max}$, n Intensity profile
k Temporal index of the repeatedly recorded z-scans
M Centre of the lateral scanning path
N Normal
oA Optical axis
t Time point of the scan
x, y, z Coordinate axes/x, y also lateral coordinate positions and z also axial coordinate position
I x-component of the movement over (p
II y-component of the movement over (p
III z-position of the maxima
φ Lateral scanning angle
ζ Axial scanning position (z-direction)

What is claimed is:

1. Method for capturing a relative alignment of a surface of a coverslip extending substantially in one plane, in which a focus of a light beam is guided along a scanning path and components of the light beam that are reflected by said surface are captured by a laser scanning microscope, wherein said scanning path extends substantially parallel to an x-y-plane of said surface that extends orthogonally to an optical axis of a detection coverslip;
   said method comprising:
   defining a Cartesian coordinate system as a spatial reference coordinate system for the coverslip, the light beam and the optical axis;
   ascertaining a relative position and alignment of said surface on the basis of the reflected components of said light beam;
   determining a relative position of the focus along the scanning path, and ascertaining said alignment by connecting a virtual straight line to and between coordinates of two reflections of said light beam to thereby construct a virtual straight connecting line between them and constructing a virtual a normal on said straight connecting line;
   virtually ascertaining alignment of the normal relative to the Cartesian coordinate system;
   comparing the ascertained alignments of the normal and the alignment of the optical axis of the detection coverslip relative to the Cartesian coordinate system with one another regarding their parallelism;
   storing results of the comparison of the ascertained alignments of the normal and the alignment of the optical axis relative to the spatial coordinates of the Cartesian coordinate system the relevant portion of the spanning;
   generating control commands for actuating a sample stage,
   which holds the coverslip and is adjustable in a controlled manner, based on the results of said comparison; and
   actuating the sample stage by way of the control commands such that the normal of the
   surface and the optical axis are aligned parallel to one another in an observed location
   and/or portion of the surface.

2. Method according to claim 1, wherein during the scanning of the scanning path, the focus is moved in a direction of the optical axis or the coverslip is moved with respect to the focus.

3. Method according to claim 1, wherein the scanning path describes a curve that is closed in the x-y-plane.

4. Method according to claim 1, wherein the scanning path describes a curve that is closed in a plane that is orthogonal to the x-y-plane.

5. Method according to claim 1, wherein the scanning path is embodied laterally as a circular scan or an approximately rectangular lateral scan trajectory.

6. Method according to claim 5, wherein the rectangular lateral scan trajectory is composed by a spectral synthesis of harmonics of a fundamental circular scanning frequency.

7. Method according to claim 1, wherein the scanning path is regionally linear.

8. Method according to claim 7, wherein the scanning path is composed by a spectral synthesis of harmonics of a fundamental z-scanning frequency.

\* \* \* \* \*

UNITED STATES PATENT AND TRADEMARK OFFICE
CERTIFICATE OF CORRECTION

PATENT NO. : 11,960,070 B2
APPLICATION NO. : 17/176694
DATED : April 16, 2024
INVENTOR(S) : Frank Klemm and Thomas Egloff It is certified that error appears in the above-identified patent and that said Letters Patent is hereby corrected as shown below:

In the Specification

Column 6, Line 30     Now reads: "A scanning angle (p is indicated by..."
Should read: -- A scanning angle φ is indicated by... --

Column 7, Line 43     Now reads: "z-stacks k→ I"
Should read: -- z-stacks -> I --

Column 7, Line 62     Now reads: "respective lateral scanning angle (p."
Should read: -- "respective lateral scanning angle φ. --

Column 8, Line 31     Now reads: "(p. Next, the location..."
Should read: -- φ. Next, the location... --

Column 10, Line 7     Now reads: "x-component of the movement over (p"
Should read: -- x-component of the movement over φ --

Column 10, Line 8     Now reads: "y-component of the movement over (p"
Should read: -- y-component of the movement over φ --

In the Claims

Column 10, Line 47     Now reads: "coordinate system the relevant portion of the spanning;"
Should read: -- coordinate system of the relevant portion of the spanning path --

Signed and Sealed this
Sixteenth Day of July, 2024

Katherine Kelly Vidal
*Director of the United States Patent and Trademark Office*